May 6, 1924.　　　　　　　　　　　　　　　　1,493,438
E. W. LODGE
LIGHTING SYSTEM FOR AUTOMOBILES
Filed May 26, 1923
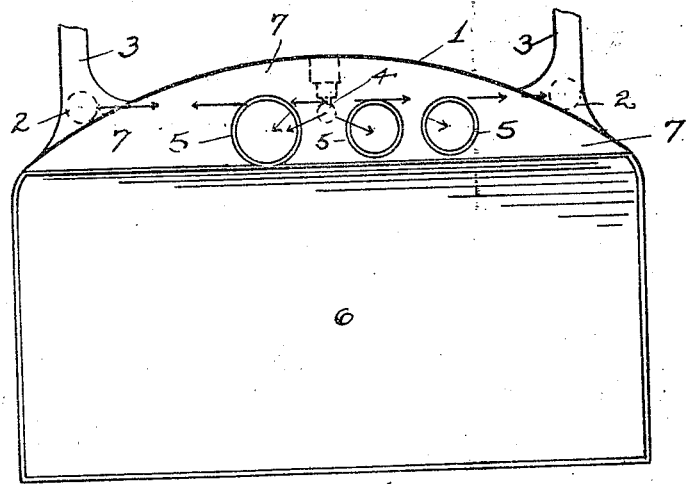
Fig 1
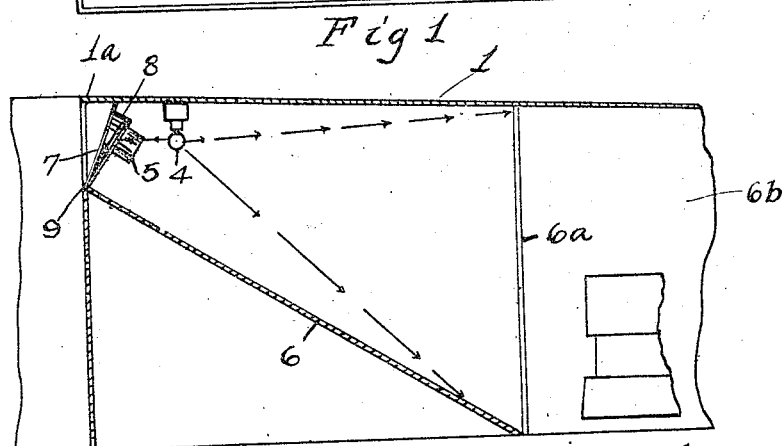
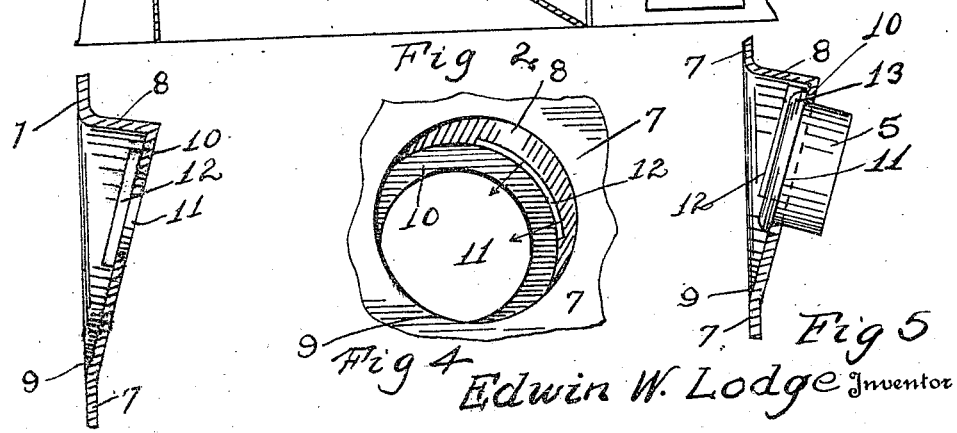
Fig 3　　　Fig 4　　　Fig 5
Edwin W. Lodge Inventor
By Walter B. Burrow.
Attorney Patented May 6, 1924.

1,493,438

UNITED STATES PATENT OFFICE.

EDWIN W. LODGE, OF NORFOLK, VIRGINIA, ASSIGNOR OF ONE-FOURTH TO FREDERICK D. COCK, OF HAMPTON, VIRGINIA.

LIGHTING SYSTEM FOR AUTOMOBILES.

Application filed May 26, 1923. Serial No. 641,674.

*To all whom it may concern:*

Be it known that I, EDWIN W. LODGE, a citizen of the United States, residing at Norfolk, in the county of Norfolk and State of Virginia, have invented certain new and useful Improvements in Lighting Systems for Automobiles, of which the following is a specification.

My invention relates to lighting systems for automobiles.

The object of the invention is to provide an economical and efficient means for illuminating the instruments located upon the instrument board also to project light inside the hood thereby lighting up the engine space or the parts towards the front of the automobile in a satisfactory manner.

Further objects and advantages will be more fully described herein and specifically pointed out in the annexed claim recourse being had to the accompanying drawing forming a part of this specification in which:

Figure 1 is a rear view of the instrument board, cowl and hood looking towards the front of the machine.

Figure 2 is a sectional side elevation through the instrument board, cowl and hood.

Figure 3 is a fragmentary cross section of a part of the instrument board showing one of the instrument depressions or pockets therein.

Figure 4 is a fragmentary portion of the instrument board depressions or unevenly stamped recesses in perspective.

Figure 5 is a fragmentary cross section of one of the pockets or recesses showing an instrument in position and the manner of illuminating the face thereof.

In the drawing like reference numerals indicate similar parts in all the several views:

1 represents the hood of the automobile and 1ª is the cowl or rear portion thereof as shown in Figure 2.

2 are the cowl lights shown by dotted circles in Figure 1 and are located in the standards 3 which form the main supports for the ordinary wind shield.

4 is the single lamp which is placed sufficiently high so as to illuminate each of the indicating instruments 5 through the hereinafter described orifices or slits and the engine space or hood illuminating projector.

7 is the single instrument board placed at a slight incline for the correct viewing of the instruments 5.

From the lower edge of the instrument board there extends an inclined tube or light projector 6 having its larger end or outlet at the division plate 6ª, (Figure 2) and projects light into the engine space 6ᵇ, thereby permitting light to enter for inspection and repairs.

The instrument board 7 is usually made of metal in which case it is provided with circular depressions or pockets made by a die so that they will be uneven, that is to say, they will be deep on one portion, as at 8, and shallow or even with the surface of the board 7 on the opposite side, as at 9. The depressions, pockets or recesses are inclined or sloping towards the front part of the hood as at 6ᵇ, Figure 2, assuming a slightly more angularity than that of the instrument board 7 when in use.

When the board is vertical as shown in Figures 3 and 5, the depressions assume an angle thereto as shown.

The instrument recesses or pockets, therefore, consist of the edge 8 of increasing depth, the bottom perforation of ring 10 which perforation is shown at 11 to receive the indicating instrument.

In the deeper portion of the edge 8 I place a narrow orifice or slit 12 which takes up a part of the circumference of the thick part 8 and has its lower portion in line with the surface of the ring portion 10 and may be of such width so as to extend slightly beyond and encircle the rim of the face of the instrument.

As shown in Figure 5, the narrow orifices or slits 12 permit the light to enter from the lamp 4 and shines completely upon the instrument face as shown by the arrows in Figure 4, as well as into the space 6ª through the tube 6, from a single lamp instead of many as in common practice.

13 is a circular bead or flange on the instruments 5 which engages the ring portion 10 and seats the same in the recesses 8.

By my invention I am able to produce an efficient instrument and engine space illumination for automobiles which is cheap to construct and requires no expensive alteration in the automobile besides, as there is only one lamp used, my invention effects a great saving and still gets the full degree of light.

I claim:

An instrument board having indentations of unequal depth stamped therein, elongated slotted openings partially surrounding the circumference of said indentations and an illuminating member situated in the rear of the board and adapted to project its beams through said slots for the purpose of illuminating instruments within the indentations.

In testimony whereof I have hereunto affixed my signature.

EDWIN W. LODGE.